United States Patent [19]
Charlton et al.

[11] 4,106,907
[45] Aug. 15, 1978

[54] CENTRIFUGE TUBE AND METHOD FOR PERFORMING ASSAY WITH SAME

[75] Inventors: John Cecil Charlton; John Stuart Glover; Bryan Peter Shepherd, all of Amersham, England

[73] Assignee: The Radiochemical Centre Limited, Amersham, England

[21] Appl. No.: 765,403

[22] Filed: Feb. 3, 1977

[30] Foreign Application Priority Data

Feb. 13, 1976 [GB] United Kingdom ............... 5848/76

[51] Int. Cl.² ..................... G01N 33/16; G01T 1/16
[52] U.S. Cl. ..................... 23/230.3; 23/230 B; 23/230.6; 23/259; 23/292; 195/103.7; 424/1; 424/12
[58] Field of Search ............. 23/259, 292, 230.3, 23/230.6; 424/1, 1.5; 195/103.7

[56] References Cited

U.S. PATENT DOCUMENTS

| | | | |
|---|---|---|---|
| 3,607,098 | 9/1971 | Strande | 23/259 |
| 3,743,482 | 7/1973 | Eisentraut | 424/1 |
| 3,867,517 | 2/1975 | Ling | 424/1 |
| 3,938,953 | 2/1976 | Paschalis | 424/1 X |
| 3,950,643 | 4/1976 | Charlton | 424/1 X |
| 3,953,172 | 4/1976 | Shapiro | 424/1 X |

OTHER PUBLICATIONS

Sargent-Welch, Scientific Catalog, pp. 217, 221.

*Primary Examiner*—Sidney Marantz
*Attorney, Agent, or Firm*—Wenderoth, Lind & Ponack

[57] ABSTRACT

A container for radioactive counting which is essentially a tube of organic plastics material which has a radiation shield extending up to the side of the tube to a uniform height. The container has a reaction zone of from 1 to 10ml with a tapered portion towards its lower end. From 1% to 10% of the reaction zone has within the zone surrounded by the radiation shield.

15 Claims, 3 Drawing Figures

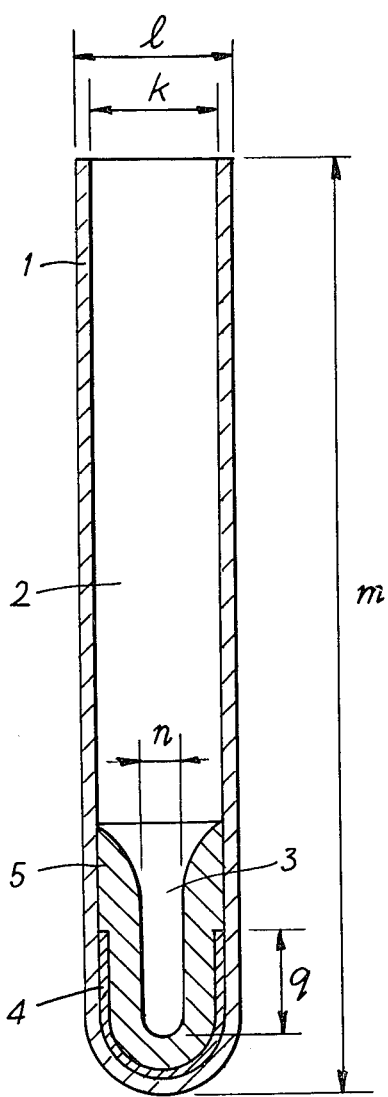

CENTRIFUGE TUBE AND METHOD FOR PERFORMING ASSAY WITH SAME

BACKGROUND OF THE INVENTION

The present invention relates to containers for radioactive counting. Such containers are particularly useful in analyses of the kind in which a radioactive element or compound is partitioned between two phases and the proportion of the radioactivity in one phase is determined. In our British Pat. No. 1,411,382 we described a technique for carrying out this sort of analysis in which the radioactive concentration of one phase was measured while it was in contact with the second phase. This technique involves shielding one of the phases while the radioactive concentration of the other is counted.

Many radio-assays involve the following steps:

(i) The sample containing the compound to be assayed is mixed in an assay tube with a standard amount of a radioactively labelled version of the compound and the two are caused to compete for reaction with a standard amount, insufficient for complete reaction, of a specific reagent for the compound to be; and (ii) Either the fraction of the compound which is bound to the specific reagent, or the fraction which is not bound, is removed from solution.

The removal of one of the fractions from solution is normally effected by precipitation and in these cases the assay tube is centrifuged so as to concentrate the precipitate into a small volume at the bottom of the tube.

In radio-immuno assays, one alternative to precipitation is to use assay tubes in which the antibody is coated on the surface of the tube, the bound portion of the antigen thereby being removed from solution as the reaction proceeds. Such tubes have been described, for example, in U.S. Pat. No. 3,646,346. Such tubes may be used in the method of our aforementioned British Patent, provided that only a part of the surface of the tube is coated with the antibody, the coated portion being shielded during counting.

SUMMARY OF THE INVENTION

It is an object of the invention to provide a container which may advantageously be used as the assay tube in such competitive radio-assays, and in other types of radio-assays where a radioactive element or compound is partitioned between two phases and the proportion of radioactivity in one phase is determined.

Conventional centrifuge tubes in commercial use today often have an external diameter of about 12mm, a total capacity of about 5ml, and are intended to contain from 1 to 3ml of a sample. It is an object of the present invention to provide a container for radioactive counting which can be used in replacement for such conventional centrifuge tubes, but which is provided with its own built-in radiation shielding. However, the invention also contemplates both larger and smaller containers.

The invention provides a container for radioactive counting, which container is a combination;

(a) a tube of organic plastics material of generally cylindrical cross-section having an open top and a closed lower end, and has fixed thereto or integral therewith, (b) a metal or metal-loaded plastics radiation shield at the lower end of the tube and extending up the side of the tube to a uniform height, the external diameter of the radiation shield preferably not being significantly greater than the external diameter of the open end of the tube, (c) the container defining a reaction zone of from 1 to 10ml to contain fluid reagents, which zone is of generally cylindrical cross-section and tapers towards the lower end of the tube, from 1% to 10% of said zone lying within the radiation shield.

In the containers of the present invention the radiation shield may be fixed either to the exterior or the interior of the tube or may be embedded within the wall of the lower end of the tube.

When the shield is fixed to the exterior of the tube, as is preferred, it is preferable that the exterior of the tube be tapered in order that a sufficiently thick shield may be fixed thereto, while preferably fulfilling the requirement that the external diameter of the shield is not substantially greater than the diameter of the open end of the tube. When a shield is fitted to the exterior of the tube, the taper at the lower end of the reaction zone is achieved by tapering the internal wall of the lower part of the tube.

If the radiation shield is fixed to the interior of the tube, the latter need not, indeed desirably does not, have a taper either to its interior or exterior wall; a normal round bottom tube being suitable. The exterior of the shield should closely follow the configuration of the interior of the lower portion of the tube and it is necessary that the fit between at least the top of the shield and the inner wall of the tube be sufficiently tight to ensure that no liquid or solid can enter the region between the outside of the shield and the inside wall of the lower part of the tube. If an internal shield is used the tapering of the lower part of the reaction zone is achieved by virtue of the shape of the shield.

The tube, which is preferably a centrifuge tube, may be of any organic plastics material. Preferred materials are polystyrene or polypropylene.

The container may also have the antibody for the antigen to be assayed bound to that portion of its internal wall which is or will be shielded from the radiation counter. In the preferred case where the shield is fixed the the exterior of the tube, the antibody will be bound to the inner wall of that part of the tube within the shield. In the alternative case where the shield is fixed to the interior of the tube the antibody will be bound to the shield. It is of course, necessary that the antibody be in contact with the liquid reagents, which the reaction zone is designed to contain when the latter are present.

When a metal shield is used any suitable metal may be used, provided that the thickness required to absorb a sufficient quantity of the radioactivity of the bound (solid) fraction is not such that the outside diameter of the shield is significantly greater than that of the tube. Preferred metals, together with the appropriate thickness required to absorb about 98% of the X-rays and $\gamma$-rays of iodine $-125$, are: lead or a lead alloy (0.1mm); copper (0.4mm); brass (0.5mm) and zinc or a zinc alloy (0.6mm). Thicker shielding would be required for a container intended to be used for counting a nuclide such as Selenium-75 which emits more energetic $\gamma$-radiation. The shield should desirably be of a thickness to absorb at least 90%, preferably at least 95%, of the radiation entering it; but it is not necessary, nor hardly practicable, that the absorption should be 100%.

As shields of metal loaded plastic organic plastics material incorporating, in powder form, a heavy metal in free or combined form, for example polyethylene loaded with lead sulphate, may be used.

BRIEF DESCRIPTION OF THE DRAWING

FIG. 3 is a longitudinal cross-section of a further container of the invention wherein the shield is fixed to the inside of the tube.

DETAILED DESCRIPTION OF THE INVENTION

Figure 1:
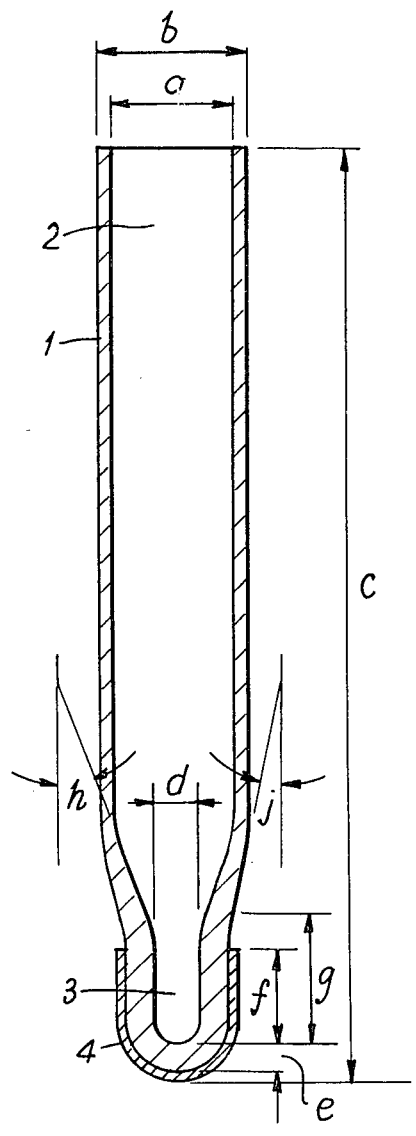
FIG. 1 is a longitudinal cross-section of one container according to the invention, wherein the shield is fixed to the outside of the tube.

Referring to FIG. 1, the tube 1 defines the reaction zone 2, which zone 2 has a tapered portion 3 towards the lower end. In this embodiment the radiation shield 4 is fixed externally to the tube. The dimensions of the container illustrated are as follows:

$a$ is 7.5 to 12.5 mm, preferably 10mm.
$b$ is 9 to 15mm, preferably 12mm.
$c$ is 55 to 95mm, preferably 75mm.
$d$ is 4 to 6mm, preferably 5mm.
$e$ is 1 to 3mm, preferably 2mm.
$f$ is 5 to 12mm, preferably 10mm.
$g$ is 7.5 to 15mm, preferably 12mm.
$h$ is 15° to 45°, preferably 25°.
$j$ is 5° to 35°, preferably 10°.

The angles $h$ and $j$ are the maximum angles subtended by the interior and exterior surfaces of the tapering walls of the tube with the cylindrical upper walls.

The tube of FIG. 1 is tapered to an internal diameter at its lower end of from 2 to 10mm. The optimum internal diameter is a compromise between conflicting requirements:

(i) if the internal diameter of the tapered portion of the tube is too small, it may become difficult or impossible to mix the contents of the tube, (ii) the smaller the internal diameter of the tapered portion of the tube, the less critical is the precise height of the radiation shield. This is because:

1. A variation in the height of the shield causes less variation in the count rate due to the liquid phase as compared with a standard tube.

2. For a given height of shield, the solid angles subtended by the solid phase of the detector is very much smaller, and hence variations in the count rate due to the solid phase, and arising from geometric factors, are of less importance.

As an example, compare a standard vial (about 9mm) internal diameter near the base) with a modified vial of 5mm internal diameter at the base. If the vial contains 1 ml of liquid, the variation in counting rate for the liquid phase due to a variation of 0.5mm in the effective height of the shield, is over 3% in the unmodified tube and 1% in the modified one.

Figure 2:
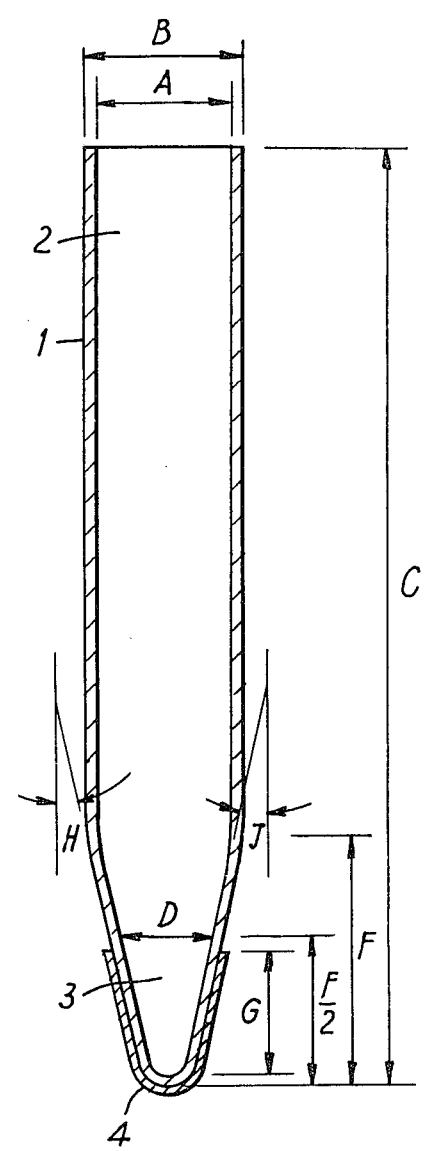
FIG. 2 is a longitudinal cross-section of a second container according to the invention, wherein the shield is external to the tube.

Referring to FIG. 2, the radiation shield 4 is fixed externally to a "Sarstedt" centrifuge tube 1 which defines the reaction zone 2, which has a tapered portion 3 towards the lower end.

The dimensions of the container are:

A = 7.5mm to 12.5mm, preferably 10mm
B = 9mm to 15mm, preferably 12mm
C = 55mm to 95mm, preferably 75mm
D = 4mm to 8mm, preferably 6mm
F = 10mm to 30mm, preferably 20mm
G = 5mm to 15mm, preferably 10mm
H = 5° to 35°, preferably 10°

Referring to FIG. 3 the radiation shield 4 is fixed to the interior of a standard round bottomed centrifuge tube 1. The reaction zone 2 has a tapered portion 3 towards its lower end which is constituted by a cover 5 over the radiation shield 4.

The dimensions of the container are:

$k$ = 7.5mm to 12.5mm, preferably 10mm
$l$ = 9mm to 15mm, preferably 12mm
$m$ = 55mm to 95mm, preferably 75mm
$n$ = 4mm to 6mm, preferably 5mm
$q$ = 5mm to 12mm, preferably 10mm The containers illustrated have a total capacity of about 5ml, and are intended to contain from 1 to 3ml of sample. About 2.5% of the total capacity of each of the reaction zones is within the zone surrounded by the radiation shield. About 5 to 12% (depending on the total volume of the sample) of the volume of a sample in the container would be within the radiation shield zone. While the dimensions indicated above may be varied within the scope of the invention, it is preferred that not more than 15% of the volume of a sample within the container should lie within the radiation shield.

A further preferred embodiment of the invention comprises a tube of shape and dimensions similar to that shown in FIG. 2, with the exception that the tube 1 is an Eppendorf tube and is much shorter, i.e. C = 30mm to 50mm, preferably 40mm. Such a container has a total capacity of about 1.5ml and is intended to contain from 0.3ml to 1ml of sample. The depth of the radiation shield is also reduced in this case, i.e. G = 1.5mm to 4.5mm preferably 3mm, the shield thus preferably covering no more than 15% of the sample volume.

Variations can be made in the containers illustrated in the Figures, within the scope of this invention, for example:

a. It is not necessary for the tube wall to be thicker at its lower end than elsewhere.

b. It is not necessary for the tapering of the external wall to be gradual. For example, the tapering could be by a single step. Indeed, it is not necessary for the external wall of the centrifuge tube to be tapered at all. However, it is preferred that the external wall of the tube be tapered, so that the container, comprising the tube plus the radiation shield, shall fit in racks and other equipment designed to take conventional centrifuge tubes.

c. The tapering internal walls of the tube do not necessarily have to be straight.

Radiation shields of copper or brass can be made by pressing or deep drawing, and can be fitted onto the centrifuge tubes, in a machine, possibly using a microdrop of a suitable adhesive to ensure adhesion.

Lead shielding would be too easily deformed to permit it to be made separately. It is therefore preferred that the centrifuge tube should be pressed into the lead while it is still in the die, or immediately after it leaves the die. However, suitable lead alloys may be die cast and would have sufficient rigidty for easy assembly. Zinc alloys, which are widely used in die-casting, may also be employed.

Radiation shields of metal-loaded plastic, such as polyethylene containing a powdered lead compound, can be moulded by conventional techniques and fitted on to the preformed centrifuge tubes, in a machine, possibly using a microdrop of a suitable adhesive.

The containers of the invention are suitable for use in radio-assays where the volume of the precipitate, after centrifuging, is not greater than 15% of the total volume of the reaction mixture. When the volume of the precipitate is greater than 15%, it will generally be preferable to completely separate the solution from the precipitate before counting either; in such cases, the containers of this invention will not be advantageous.

In the radio-assays for which the containers of the present invention may be used, the counting may be effected on either the liquid phase or on the "solid" phase (the precipitate or the phase bound to the walls of the tube). The manner of operation of such radio-assays may be varied so as to optimize either liquid phase or solid phase counting. Use of the containers of the present invention necessarily requires that the liquid phase be counted, since the solid phase is shielded from the counter by the radiation shield and it is thus preferable that, when the containers of the present invention are employed, the assay be optimized for liquid phase counting.

The following Examples compare the performance of containers of this invention with the normal technique in typical radio-assays:

EXAMPLE I

ASSAY OF HUMAN PLACENTAL LACTOGEN (a) Standard Procedure

The assay was carried out using the instructions and materials supplied as a kit (HPL Immunoassay Kit, Code IM. 68) by The Radiochemical Centre Ltd, Amersham. In the assay, a representative pooled human pregnancy serum (control serum) was assayed against the standards, of known values, supplied as part of the kit. The procedure is briefly:

(a) pipette 50$\mu$l of the control serum (or of a reconstituted standard serum) into a plastic tube. A number of such tubes are prepared;

(b) pipette 500$\mu$l of the iodinated ($^{125}$I) HPL solution into each tube and mix;

(c) pipette 500$\mu$l of the antiserum solution into each tube, and mix;

(d) stand for 30 minutes at room temperature;

(e) pipette 2.0ml of absolute ethanol into each tube and mix by vortexing for about 2 seconds;

(f) centrifuge at 1000g or more for 5 minutes;

(g) pour off the supernate and discard, and allow the tubes to drain for 5 minutes inverted on filter paper;

(h) determine the radioactivity in the precipitate by counting the tubes in a gamma scintillation counter; and (i) plot counts in precipitate against the declared HPL content of the standards and read off the HPL content of the control serum.

(b) Using shielded tubes

Two patterns of shielded tubes were employed, namely the conical type (A; as shown in FIG. 2) and the type with a reduced bore at the bottom portion (B; FIG. 1).

The assay procedures were identical to the above except that step (g) was omitted, and step (h) modified to:

(h) determine the radioactivity of the supernate by inserting the shielded tube in a gamma scintillation counter and counting directly. The values obtained were plotted against the declared HPL contents of the standards and the HPL content of the control serum read off.

(c) Results

| Method | HPL Content of Control Serum |
|---|---|
| Standard method | 4.35$\mu$g/ml (CV 5.5%,n = 20) |
| Shielded tube Type A | 4.75$\mu$g/ml (CV 4.4%,n = 20) |
| Shielded tube Type B | 4.80$\mu$g/ml (CV 5.9%,n = 20) |

The figures indicate that entirely satisfactory results may be obtained with the shielded tubes.

EXAMPLE 2

ASSAY OF SERUM TRIIODOTHYRONINE (a) Standard Procedure

The assay was carried out using the instructions and materials supplied as a kit (T3 RIA kit, Code IM.74) by The Radiochemical Centre Ltd, Amersham. In the assay a pooled human serum (the "control serum") was assayed against the standards, of known values, supplied as part of the kit. The procedure is briefly:

(a) pipette 50$\mu$l of the control serum (or of a reconstituted standard serum) into a plastic tube (A number of such tubes are prepared).

(b) pipette 200$\mu$l of the triiodothyronine ($^{125}$I) into each tube, and mix;

(c) pipette 200$\mu$l of the antiserum into each tube and mix;

(d) cover tubes with a plastic film, or stopper, and heat at 37° C for 1 hour;

(e) pipette 1.0ml of the stirred, reconstituted, ion exchange resin suspension to each tube;

(f) cap tubes, and mix on a rotator or shaker for 60 minutes at room temperature;

(g) centrifuge at 1000g for 5 minutes;

(h) remove 1.0ml of the supernate into a counting tube;

(i) count the aliquots of the supernates in a gamma scintillation counter; and (j) plot the counts against the declared triiodothryonine contents of the standards, and read off the triiodothyronine content of the control serum.

(b) Using Shielded Tubes

The patterns of shielded tubes were employed, namely the conical type (A; FIG. 2) and the type with a reduced bore at the bottom portion (B; FIG. 1). The assay procedures were identical to the above except that step (h) was omitted, and step (i) modified to:

(i) determine the radioactivity of the supernate by inserting the shielded tube in a gamma scintillation camera and counting directly. The values obtained were plotted against the declared triiodothyronine contents of the standards, and the triiodothyronine content of the control serum read off.

Results

| Method | Triiodothyronine content of control serum |
|---|---|
| Standard Method | 1.33 ng/ml (CV 9.0%n = 18) |
| Shielded tube, Type A | 1.28 ng/ml (CV 7.8%n = 18) |
| Shielded tube, Type B | 1.40 ng/ml (CV 8.0%n = 18) |

The figures indicate that entirely satisfactory results may be obtained with the shielded tubes.

When the solid phase is separated by centrifugation, it is important that there should be no re-suspension of the solid phase during the period between centrifuging and counting. It is often convenient for the efficient utilization of laboratory counting equipment to store samples for up to 24 hours between centrifuging and counting, and additionally, the passage of the tubes through an automatic gamma counter subjects them to jolting which might disturb the solid phase. Similar considerations apply to other separation methods, for example, in some cases the solid phase is merely allowed to settle without centrifuging. This point has been examined for a number of commercial radioimmunoassays (RIA), supplied by The Radiochemical Centre Ltd., as follows:

Thyroxine RIA, Oestriol RIA, Digoxin RIA, Anti-DNA Assay, Follicle Stimulating Hormone RIA and Insulin RIA.

In none of these cases were any significant differences in count rate observed when samples were circulated through an automatic gamma counter and measured at intervals up to a total time of 24 hours. In some cases, the measurements were extended to 120 hours, again without significant effect. With HPL the observed Count rates rose somewhat (about 1% in 24 hours) but, as this was uniform for all tubes in the assay, the accuracy and precision of the assay was not affected.

We claim:

1. A container for radioactive counting, said container comprising:
   a tube of organic plastics materials having a generally cylindrical cross-sectioned reaction zone at the top portion thereof, an open top end, and a closed tapered lower end portion tapered from said top portion;
   a radiation shield permanently positioned at the lower end of said tube and extending up the side of said tube to a uniform height; and
   said reaction zone having a volume of 1–10ml, and 1–10% of said reaction zone being surrounded by said shield.

2. A container according to claim 1 wherein said radiation shield is fixed to the interior of said tube.

3. A container according to claim 1 wherein said radiation shield is embedded in the wall of said tube.

4. A container according to claim 1 wherein said radiation shield is made of a metal selected from the group consisting of copper, lead lead alloys, brass, zinc and zinc alloys.

5. A container according to claim 1 wherein said radiation shield is of sufficient thickness to absorb at least 95% of the radiation emitted by iodine −125.

6. A container as claimed in claim 1 wherein the outside diameter of said tube is substantially the same as the outside diameter of said radiation shield.

7. A container as claimed in claim 1, wherein said radiation shield is a metal shield.

8. A container as claimed in claim 1, wherein said radiation shield is a plastic shield with metal contained therein.

9. A container as claimed in claim 1, wherein said tube is a centrifuge tube of material selected from the group of materials consisting of polystyrene and polypropylene.

10. A container as claimed in claim 1, further comprising an antibody for an antigen to be assayed by radioimmuno assay coating the innermost surface inside said shielded container.

11. A container according to claim 1 wherein said radiation shield is fixed to the exterior of said tube.

12. A container according to claim 11, as shown in FIG. 1 and having the following dimensions:
    $a = 10$mm
    $b = 12$mm
    $c = 75$mm
    $d = 5$mm
    $e = 2$mm
    $f = 10$mm
    $g = 10$mm
    $h = 25°$
    $j = 10°$ 13. A container according to claim 11, as illustrated in FIG. 2 and having the following dimensions:
    $A = 9.5$mm
    $B = 12$mm
    $C = 75$mm
    $D = 6$mm
    $F = 20$mm
    $G = 10$mm
    $H\text{-}J = 10°$ 14. A method of assaying a compound comprising the steps of:
    introducing a sample containing said compound to be assayed together with a standard amount of a radioactivity labelled version of said compound and a standard amount, insufficient for complete reaction, of a specific reagent for said compound to be assayed into a tube-like container of plastics materials having a generally cylindrical cross-sectioned reaction zone at the top portion thereof, an open end, and a closed, tapered lower end portion tapered from said top portion, said container further having a radiation shield permanently positioned at the lower end thereof and extending up the side of said tube to a uniform height and said reaction zone having a volume of 1–10ml with 1–10% of said reaction zone being surrounded by said shield;
    causing said two compounds to compete for reaction with said specific reagent;
    removing from the liquid phase the fraction of the compound which is bound to the specific reagent so that the fraction removed from the liquid phase is contained within said shielded portion of said container, and
    introducing said container into a counter and determining the radioactivity of that portion of the contents that is not shielded by said shield.

15. A method of assaying a compound comprising the steps of:
    introducing a sample containing said compound to be assayed together with a standard amount of a radioactivity labelled version of said compound and a standard amount, insufficient for complete reaction, of a specific reagent for said compound to be assayed into a tube-like container of platsics materials having a generally cylindrical cross-sectioned reaction zone at the top portion thereof, an open end, and a closed, tapered lower end portion tapered from said top portion, said container further having a radiation shield permanently positioned at the lower end thereof and extending up the side of said tube to a uniform height and said reaction zone having a volume of 1–10ml with 1–10% of said reaction zone being surrounded by said shield;
    causing said two compounds to compete for reaction with said specific reagent;
    removing from the liquid phase the fraction of the compound which is unbound to the specific reagent so that the fraction removed from the liquid phase is contained within said shielded portion of said container; and
    introducing said container into a counter and determining the radioactivity of that portion of the contents that is not shielded by said shield.

* * * * *